June 7, 1927.
J. M. RUSSELL
1,631,768
PARACHUTE HARNESS
Filed April 22, 1926
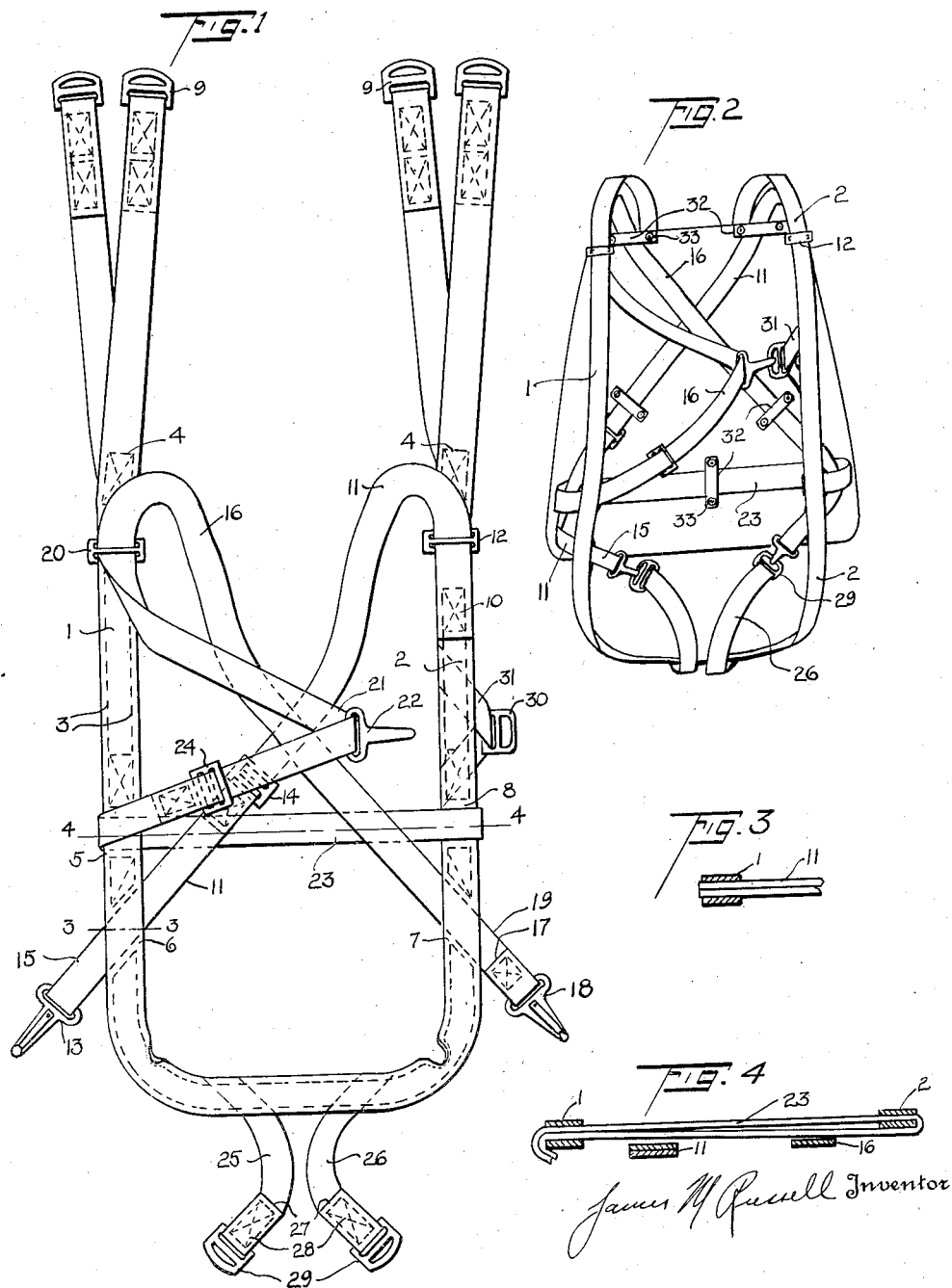

Patented June 7, 1927.

1,631,768

UNITED STATES PATENT OFFICE.

JAMES M. RUSSELL, OF SAN DIEGO, CALIFORNIA, ASSIGNOR TO HERBERT R. McCLINTOCK, OF SAN DIEGO, CALIFORNIA.

PARACHUTE HARNESS.

Application filed April 22, 1926. Serial No. 103,858.

This invention relates to parachute harnesses by means of which the aviator is connected to the suspension parachute.

The primary object of the invention is the provision of a suspension harness which may be comfortably worn and which may be easily adjusted as to size.

A further object is the provision of a harness of this nature formed of a main suspension sling to which a parachute is adapted to be connected, which is provided with combined leg straps and back straps, the leg straps forming a continuation of the back straps and slidingly engaging lower portions of the main suspension strap. One of the back straps is attached in front of one shoulder to a main suspension strap. The other back strap is loosely engaged in front of one shoulder with a main suspension strap and continues on to form a front strap which is looped across the front of the aviator, and provided with a quickly detachable means for attachment to the opposite suspension strap at the side of the aviator. The front strap continues on slidingly engaging the main suspension strap which it engages at the shoulder and passes on around in back of the aviator and engages the other suspension strap so as to form a back waist strap. The length of the combined back strap, front strap and leg strap just mentioned may be adjusted by a single length adjusting device, since this strap is at no point attached fixedly to the main suspension straps.

A further object is the provision of a parachute harness which is provided with a front body strap, having an attaching hook which is adapted to be connected to a main suspension strap at the side of the aviator Another object of the invention is the provision of a combined harness and pack in which the pack is connected to the harness by means of easily detachable pack straps so that the harness and pack may be readily separated for ease in packing and for ready replacement.

Further objects and advantages of my invention will be more fully set forth in detail in the following description and in the accompanying drawing, in which Fig. 1 is a view looking at the front of the harness.

Fig. 2 is a perspective view showing the manner in which the harness is attached to the pack.

Fig. 3 is a section on the line 3—3 of Fig. 1.

Fig. 4 is a section on the line 4—4 of Fig. 1.

Referring more particularly to the drawings by reference numerals, the two main suspension straps 1 and 2 are each formed of a pair of flexible fabric suspension straps which are stitched together by the stitching 3 starting from the points 4, with the exception of the points 5, 6, 7 and 8 where the two straps of the pairs provide passages through which the other straps may be passed. The main suspension straps 1 and 2 are interconnected at the bottom so as to provide a sling which passes beneath the seat of the aviator. The main suspension straps extend upwardly, one on each side of the aviator, and in front of his shoulders. The various straps forming the main suspension straps are provided at their upper ends with rings 9 which are located within the pack and to which the parachute is adapted to be connected.

Stitched to the main suspension strap 2 at the point 10 is a short back strap 11 which is adjustably connected to the suspension strap by a slide buckle 12. The back strap extends from the buckle 12, which is located in front of the shoulder, back over the shoulder and then diagonally down across the back and through the loop provided at 6 as shown in Fig. 4. The strap 11 then passes through the hook 13 and then returns parallel to itself and is attached at its end to a length adjusting device 14. The lower end portion of the back strap 11 thus provides a leg strap 15 as a continuation of the same.

A main body strap 16 is formed as a combined leg strap, back strap, front strap and waist strap. One end of this strap is attached by a looped end 17 to the snap hook 18 to provide a leg strap 19. The strap 16 then passes between the two suspension straps which make up the main suspension strap at 2 at the point 7, and extend upwardly and diagonally across the back of the aviator and then down over the shoulder where it engages the suspension strap 1 by means of the slide buckle 20. It then continues across in front of the chest providing a loop 21 in which is provided a quickly detachable snap hook 22. The strap 16 then reverses and passes through the two parts of the main suspension strap 1 at the point 5, continuing on around and back of the aviator so as to form a waist strap 23. It then passes through the main suspension strap 2 at the point 8, then around in front of the main suspension strap 2, returning through the point 5 and having at its end the length adjusting device 24. Since the main body strap 16 is not fastened fixedly at any point to the main suspension straps, the single length adjusting device 24 may take up all slack in this strap so that the harness may fit aviators of different sizes. It will be understood that the strap 16 passes freely through the parts of the main suspension strap at the points 5, 7 and 8, so that the length of the strap 16 may be adjusted at a single point.

At the bottom of the main suspension straps are provided the two short leg strap attachments 25 and 26 which are stitched at their ends so as to be held between the two parts of the main suspension straps. The ends of these leg strap attachments are looped over at 27 and stitched at 28 so as to be firmly attached to the rings 29. These leg strap attachments are provided with no length adjusting means since the leg straps 15 and 19 are of adjustable length. The rings 29 are of course adapted to be engaged in a quickly detachable manner with the snap hooks 13 and 18 so that together they will embrace the legs of the aviator. The leg straps will therefore be as free as possible from metallic parts.

The hook 22, which is provided in the loop 21 of the body strap, is adapted to be easily connected to the D-ring 30, which is attached by means of a short strap 31, to the main suspension strap 2. The ends of this short strap 31 are stitched between the two parts of suspension strap 2. The D-ring is located very close to the suspension strap 2 so that the metal hook and ring will be located at the side of the wearer. The ring and hook will therefore not be pressed into the aviator's body and the harness will be much more comfortable than if the hook was located centrally in front of the aviator.

The slide buckles 12 and 20 adjustably interconnect the main suspension straps with the two straps 11 and 16. These buckles are not firmly attached to any of the straps but may be slid along so as to properly position the point of suspension of the aviator at the proper places in front of his shoulders.

It will now be clear that the harness may be adapted to fit any size of wearer by means of the two length adjusting devices. In case a harness is to be used by one person, after the proper length of the various straps has been determined by the length adjusting devices, the main suspension straps may, if desired, be stitched to the straps 11 and 16 at one or more of the points 5, 6, 7 and 8.

Fig. 2 shows the manner in which the pack which contains the parachute is attached to the harness. For this purpose the pack is provided with short straps 32, having at their ends quickly detachable fasteners 33 of the "Lift-a-dot" type. These straps 32 extend over the various parts of the harness as shown so that the harness is attached in a manner which permits its easy separation from the pack for purposes of replacement or to permit the pack to be easily packed with a parachute. The main suspension straps 1 and 2 are shown as extending over the straps 11 and 16 at the shoulders and projecting into the pack at the top where they are adapted to be connected to the parachute. The pack shown in Fig. 2 is adapted to be worn on the back of the aviator but of course it is obvious that packs may be attached to the harness in other positions than that shown.

I am aware that various changes and modifications may be made without departing from the spirit or scope of my invention and I do not intend to be limited to the precise form which has been chosen for purposes of illustration.

I claim:

1. In a parachute harness, in combination, suspension straps extending down in front of the aviator's shoulders and beneath the aviator's seat in the form of a sling, a front strap extending down from one suspension strap at the front of one shoulder, crossing the chest to a point at the opposite side of the body and then returning at the front and engaging with said one suspension strap again and continuing on around back of the body for engagement with the other suspension strap, a back strap engaging the said other suspension strap and extending down back over the other shoulder, crossing over at the back of the body and engaging said one suspension strap at the side of the body, a pair of leg strap attachments at the bottom of the suspension straps, and a snap hook detachably interconnecting the front strap at said point to the adjacent suspension strap so that said hook is at the side of the aviator and closely adjacent to said adjacent suspension strap.

2. In a parachute harness, in combination, suspension straps extending down in front of the aviator and beneath the aviator's seat in the form of a sling, a front strap extending down from one suspension strap at the front of one shoulder, crossing the chest to a point at the opposite side of the body and then returning at the front and engaging with said one strap again and continuing on around back of the aviator's waist for engagement with the other suspension strap, a back strap extending from the other suspension strap down back over the shoulder crossing in back of the aviator and engaging the suspension strap at the opposite side of the body, quickly detachable means interconnecting the first mentioned front strap at said point to the adjacent suspension strap so that said detachable means is positioned at the side of the aviator and closely adjacent to said adjacent suspension strap, leg strap attaching means at the bottom of the suspension straps, a second back strap engaging both said suspension straps and crossing the first back strap at the back of the body, said back straps adjustably engaging said suspension straps and extending downwardly at their lower ends from the suspension straps and adapted to be connected to said mentioned means.

3. In a parachute harness, in combination, a pair of suspension straps extending downwardly in front of the aviator's shoulders and beneath the aviator's seat to form a sling, quickly detachable means interconnecting the suspension straps at the front of the aviator, a pair of back straps each engaging a suspension strap at the shoulders and extending down and crossing at the back and movably engaging a low part of the other suspension strap at points at opposite side of the aviator and continuing on to provide free ends which serve as leg embracing straps, adapted to be connected to the bottom of the sling.

4. In a parachute harness, in combination, a pair of suspension straps extending downwardly in front of the aviator's shoulders and beneath the aviator's seat to form a sling, quickly detachable means interconnecting the suspension straps at the front of the aviator, a pair of back straps each engaging a suspension strap at the shoulders and extending down and crossing at the back and engaging a low part of the other suspension strap at points at opposite side of the aviator and continuing on to provide free ends which serve as leg embracing straps, adapted to be connected to the bottom of the sling, the engagement of the back straps at said mentioned points being loose to permit the back straps to be slipped through the suspension straps, and length adjusting means to adjust the length of the combined leg straps and back straps.

5. In a parachute harness, in combination, a pair of suspension straps extending downwardly in front of the aviator's shoulders and beneath the aviator's seat to form a sling, quickly detachable means interconnecting the suspension straps at one side in front of the aviator, a pair of back straps each adjustably engaging a suspension strap at the shoulders and extending down and crossing at the back and engaging a low part of the other suspension strap at points at opposite side of the aviator and continuing on to provide leg embracing straps, straps connected to the bottom of the sling and having means for quick attachment to the ends of the back straps, the engagement of the back straps at said mentioned points being loose to permit the back straps to be slipped through the suspension straps, and length adjusting means to adjust the length of the combined leg straps and back straps.

6. In a parachute harness, in combination, suspension straps extending down in front of the aviator's shoulders and beneath the aviator's seat in the form of a sling, a front strap extending down from one suspension strap at one shoulder, crossing the chest to a point at the opposite side of the body and then returning at the front and engaging with said one suspension strap again and continuing on around back of the body for engagement with the other suspension strap, a back strap engaging the said other suspension strap and extending down back over the other shoulder, crossing over at the back of the body and engaging said one suspension strap at the side of the body, a second back strap forming a continuation of the front strap at the shoulder, crossing the first back strap and engaging the other suspension strap, means adjustably engaging the back straps with the suspension straps at the shoulders, a pair of leg strap attachments at the bottom of the suspension straps, and means detachably interconnecting the front strap at said point to the adjacent suspension strap, said means being located at one side of the aviator when the harness is worn.

7. A parachute harness comprising suspension straps extending down in front of the aviator's shoulders and interconnected at their lower ends, a back strap fixed to one suspension strap in front of one shoulder and extending back over the shoulder then down and crossing to the second suspension strap, slidingly engaging said second suspension strap and continuing on for a substantial distance to form a leg strap, a single length adjusting device for said back strap to adjust the length of the said back strap and leg strap, a combined leg strap, front strap and back strap crossing the first back strap at the back and engaging said second suspension strap at two points and providing a loop between said two points extending across the front of the aviator and having detachable means for quickly engaging the said one suspension strap at the side of the aviator, and a single length adjusting device for adjusting the length of the said combined leg strap front strap and back strap.

8. A parachute harness comprising suspension straps extending down in front of the aviator's shoulders and interconnected at their lower ends to form a sling, a back strap fixed to one suspension strap in front of one shoulder and extending back over the shoulder then down and crossing to the second suspension strap, slidingly engaging said second suspension strap and continuing on for a substantial distance to form a leg strap, a single length adjusting device for said back strap to adjust the length of both the said back strap and leg strap, a combined leg strap front strap and back strap crossing the first back strap at the back and adjustably engaging said second suspension strap in front of the shoulder and at the side and providing a loop extending across the front of the aviator and continuing on around back of the aviator to the said one suspension strap, quickly attachable means on said loop for engaging the said one suspension strap at the side of the aviator, and a single length adjusting device for adjusting the length of the said combined leg strap front strap and back strap.

9. A parachute harness as set forth in claim 8 together with a pair of short straps connected to the suspension straps at the bottom of the sling and having means at their loose ends adapted to be quickly engaged with the ends of the said leg strap.

10. A parachute harness as set forth in claim 8 said suspension straps each being made of a pair of straps fixedly attached together at places to provide guides for the free passage of the combined leg straps and back straps there between.

11. In combination, a parachute harness having a pair of back straps and a waist strap, a parachute pack having a parachute therein, and a series of easily detachable connections between the pack and the harness consisting of short straps detachably connected at one end to the pack and adapted to extend over and embrace the parts of the harness adjacent thereto.

12. In combination, a parachute pack, a harness having several straps adapted to lie flat against one side of the pack, and quickly detachable connections between the said straps of the harness and the side of the pack to hold the said straps in place.

In testimony whereof I have hereunto set my hand this 13th day of April, 1926.

JAMES M. RUSSELL.